(12) United States Patent
Jackson, Jr.

(10) Patent No.: US 9,280,574 B2
(45) Date of Patent: Mar. 8, 2016

(54) RELATIVE CLASSIFICATION OF DATA OBJECTS

(76) Inventor: Robert Lewis Jackson, Jr., Beitar Illit (IL)

( * ) Notice: Subject to any disclaimer, the term of this patent is extended or adjusted under 35 U.S.C. 154(b) by 0 days.

(21) Appl. No.: 13/226,282

(22) Filed: Sep. 6, 2011

(65) Prior Publication Data

US 2012/0060125 A1  Mar. 8, 2012

Related U.S. Application Data

(60) Provisional application No. 61/380,060, filed on Sep. 3, 2010.

(51) Int. Cl.
*G06F 3/048* (2013.01)
*G06F 17/30* (2006.01)

(52) U.S. Cl.
CPC .... *G06F 17/30327* (2013.01); *G06F 17/30554* (2013.01); *G06F 17/30572* (2013.01); *G06F 17/30589* (2013.01); *G06F 17/30864* (2013.01)

(58) Field of Classification Search
CPC ...................................................... G06F 3/048
USPC ........................................................ 715/853
See application file for complete search history.

(56) References Cited

U.S. PATENT DOCUMENTS

| | | | |
|---|---|---|---|
| 5,515,487 A | 5/1996 | Beaudet et al. |
| 5,546,529 A | 8/1996 | Bowers et al. |
| 5,560,005 A | 9/1996 | Hoover |
| 5,721,900 A | 2/1998 | Banning et al. |
| 5,749,079 A | 5/1998 | Yong et al. |
| 5,933,831 A | 8/1999 | Jorgensen |
| 6,105,018 A | 8/2000 | Demers et al. |
| 6,175,836 B1 | 1/2001 | Aldred |
| 6,373,484 B1 | 4/2002 | Orell et al. |
| 6,377,287 B1 | 4/2002 | Hao et al. |
| 6,553,371 B2 | 4/2003 | Gutierrez-Rivas et al. |
| 6,567,802 B1 | 5/2003 | Popa et al. |
| 6,763,361 B1 | 7/2004 | Poskanzer |
| 6,772,180 B1 | 8/2004 | Li et al. |
| 6,801,229 B1 | 10/2004 | Tinkler |
| 6,801,905 B2 | 10/2004 | Andrei |
| 6,854,091 B1 | 2/2005 | Beaudoin |

(Continued)

OTHER PUBLICATIONS

"Using Hibernate in a Java Swing Application," product tutorial retrieved from website http://netbeans.org/kb/docs/java/hibernate-java-se.html (12 pgs).

(Continued)

*Primary Examiner* — Jennifer To
*Assistant Examiner* — Xuyang Xia
(74) *Attorney, Agent, or Firm* — Radlo IP Law Group; Edward J. Radlo

(57) ABSTRACT

Systems and methods for use in presenting a plurality of data nodes that include one or more data sets and one or more data objects, wherein each data set includes zero or more data objects and zero or more other data sets. The method includes determining, by a computing device, a data node of interest from the plurality of data nodes, wherein the data node of interest is included in one or more data sets. The computing device depicts the data node of interest as a primary node and depicts at least one of the data sets that includes the data node of interest as a secondary node that is subordinate to the primary node. The computing device also depicts an edge between the primary node and the secondary node.

22 Claims, 7 Drawing Sheets

(56) References Cited

U.S. PATENT DOCUMENTS

| | | |
|---|---|---|
| 6,941,317 B1 | 9/2005 | Chamberlin et al. |
| 7,103,600 B2 | 9/2006 | Mullins |
| 7,224,362 B2 | 5/2007 | Kincaid et al. |
| 7,320,001 B1 | 1/2008 | Chen |
| 7,366,723 B2 | 4/2008 | Shaburov |
| 7,467,125 B2 | 12/2008 | Khatchatrian et al. |
| 8,051,105 B1 | 11/2011 | Johnson |
| 8,392,467 B1 | 3/2013 | Johnson |
| 8,401,292 B2 | 3/2013 | Park et al. |
| 8,832,111 B2 | 9/2014 | Venkataramani et al. |
| 8,978,010 B1 | 3/2015 | Thumfart et al. |
| 8,983,898 B1 | 3/2015 | Alfonseca et al. |
| 2003/0065527 A1 | 4/2003 | Yeh et al. |
| 2003/0115545 A1 | 6/2003 | Hull et al. |
| 2004/0093559 A1 | 5/2004 | Amaru et al. |
| 2004/0181554 A1* | 9/2004 | Heckerman et al. ....... 707/104.1 |
| 2004/0205726 A1 | 10/2004 | Chedgey et al. |
| 2004/0205727 A1 | 10/2004 | Sit et al. |
| 2004/0215649 A1 | 10/2004 | Whalen et al. |
| 2004/0249809 A1 | 12/2004 | Ramani et al. |
| 2005/0108217 A1 | 5/2005 | Werner et al. |
| 2005/0251371 A1* | 11/2005 | Chagoly et al. .................. 703/1 |
| 2006/0015588 A1 | 1/2006 | Achlioptas et al. |
| 2006/0161557 A1 | 7/2006 | Dettinger et al. |
| 2006/0173865 A1 | 8/2006 | Fong |
| 2006/0173873 A1 | 8/2006 | Prompt et al. |
| 2006/0253476 A1 | 11/2006 | Roth et al. |
| 2007/0027905 A1 | 2/2007 | Warren et al. |
| 2007/0180408 A1* | 8/2007 | Rusu et al. .................... 715/855 |
| 2008/0056572 A1 | 3/2008 | Nielsen |
| 2008/0065655 A1 | 3/2008 | Chakravarthy et al. |
| 2008/0163123 A1 | 7/2008 | Bernstein |
| 2008/0222114 A1 | 9/2008 | Schreiber |
| 2008/0228697 A1 | 9/2008 | Adya et al. |
| 2008/0256121 A1 | 10/2008 | Liu et al. |
| 2008/0294641 A1 | 11/2008 | Kim |
| 2009/0064053 A1 | 3/2009 | Crawford et al. |
| 2009/0080853 A1 | 3/2009 | Chen et al. |
| 2009/0094217 A1 | 4/2009 | Dettinger et al. |
| 2009/0115785 A1 | 5/2009 | Grandhi et al. |
| 2009/0122065 A1 | 5/2009 | Patil et al. |
| 2009/0125846 A1 | 5/2009 | Anderson et al. |
| 2009/0175543 A1 | 7/2009 | Nielsen |
| 2009/0182837 A1* | 7/2009 | Rogers .......................... 709/215 |
| 2009/0210631 A1 | 8/2009 | Bosworth et al. |
| 2009/0240682 A1 | 9/2009 | Balmin et al. |
| 2009/0296568 A1 | 12/2009 | Kitada |
| 2010/0079460 A1 | 4/2010 | Breeds et al. |
| 2010/0079461 A1 | 4/2010 | Breeds et al. |
| 2010/0174754 A1 | 7/2010 | B'Far et al. |
| 2010/0191718 A1 | 7/2010 | Coriell et al. |
| 2010/0214313 A1* | 8/2010 | Herman et al. ................ 345/593 |
| 2010/0229130 A1* | 9/2010 | Edge ................... G06F 3/04886 715/863 |
| 2011/0270606 A1 | 11/2011 | Crochet et al. |
| 2012/0229466 A1 | 9/2012 | Riche et al. |
| 2013/0174129 A1 | 7/2013 | Grammel et al. |
| 2013/0325864 A1 | 12/2013 | Sarshar et al. |
| 2014/0304214 A1 | 10/2014 | Sakunkoo et al. |

OTHER PUBLICATIONS

"View (database)," retrieved from Wikipedia at http://en.wikipedia.org/wili/View_(database) (3 pgs).

"Welcome to the dbViz, Database Visualizer project!" retrieved from website http://jdbv.sourceforge.net/dbViz/.

T. Sentissi, E. Pichat, "A graphical user interface for object-oriented database," sccc, pp. 227, 17th International Conference of the Chilean Computer Science Society (SCCC '97), 1997.

P. Sawyer, I. Sommerville, "User interface tools for object-oriented database systems," IEE Colloquium on Software Tools for Interface Design, Nov. 8, 1990, pp. 9/1-9/4, London.

International Search Report and Opinion for co-pending PCT patent application No. PCT/US2011/050567.

International Preliminary Report on Patentability (PCT/IB/373) and a Written Opinion of the International Searching Authority (PCT/ISA/237) dated Mar. 14, 2013 for co-pending International Application No. PCT/US2011/050567 (7 pgs).

Kennedy, J. and Barclay. P. (Eds), "Interfaces to Databases (IDS-3)", Proceedings of the 3rd International Workshop on Interfaces to Databases, Napier University, Edinburgh, Scotland, Jul. 8-10, 1996, 12 pgs.

"Graph Rewrite Systems for Program Optimization", Uwe Assmann, Transactions on Programming Languages and Systems, vol. 22 No. 4, published Jul. 2010, U.S.A.

"Graph-based KNN Text Classification" Zonghu Wang and Zhijing Liu, Seventh International Conference on Fuzzy Systems and Knowledge Discovery (FSKD 2010), pp. 2363-2366, published by IEEE in 2010, U.S.A.

* cited by examiner

RELATIVE CLASSIFICATION OF DATA OBJECTS

CROSS-REFERENCE TO RELATED APPLICATIONS

This application claims the benefit of U.S. Provisional Application No. 61/380,060, filed 3 Sep. 2010, which is hereby incorporated by reference in its entirety.

BACKGROUND OF THE INVENTION

The subject matter disclosed herein relates generally to data presentation and, more specifically, to systems and methods for use in presenting a graph of data objects using a scheme of relative classification.

At least some known software applications present data objects stored in a tree structure as nodes in a graphical tree structure that represents the hierarchical relationship between the data objects. Notably, such a presentation technique may provide a user with only one perspective that is based on the predefined object hierarchy. Further, some known software applications present a graph of nodes, which may not be a simple tree structure, as a collection of interconnected nodes with no hierarchical organization, potentially confusing a user who is primarily interested in one node or one particular set of nodes. Known software applications do not enable a hierarchy to be defined at will with respect to a graph of nodes, such that the relationships between the nodes is presented from the perspective of a selected primary node, with both child nodes and parent nodes of the primary node presented as subordinate to the primary node.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a method for use in presenting a plurality of data nodes that include one or more data sets and one or more data objects, wherein each data set includes zero or more data objects and zero or more other data sets. The method includes determining, by a computing device, a data node of interest from the plurality of data nodes, wherein the data node of interest is included in one or more data sets. The computing device depicts the data node of interest as a primary node and depicts at least one of the data sets that include the data node of interest as a secondary node that is subordinate to the primary node. The computing device also depicts an edge between the primary node and the secondary node.

In another aspect, a device including a memory device and a processor coupled to the memory device. The memory device stores a plurality of data nodes that include one or more data sets and one or more data objects. Each data set includes zero or more data objects and zero or more other data sets. The processor is programmed to determine a data node of interest from the plurality of data nodes. The data node of interest is included in one or more data sets. The processor is also programmed to depict the data node of interest as a primary node, to depict at least one of the data sets that include the data node of interest as a secondary node that is subordinate to the primary node, and to depict an edge between the primary node and the secondary node.

In yet another aspect, one or more non-transitory computer-readable media having computer-executable instructions embodied thereon are provided. When executed by at least one processor, the computer-executable instructions cause the processor to: determine a data node of interest from a plurality of data nodes that include one or more data sets and one or more data objects, wherein each data set includes zero or more data objects and zero or more other data sets, and wherein the data node of interest is included in one or more data sets; depict the data node of interest as a primary node; depict at least one of the data sets that includes the data node of interest as a secondary node that is subordinate to the primary node; and depict an edge between the primary node and the secondary node.

BRIEF DESCRIPTION OF THE DRAWINGS

The embodiments described herein may be better understood by referring to the following description in conjunction with the accompanying drawings.

DETAILED DESCRIPTION OF THE INVENTION

Figure 1:
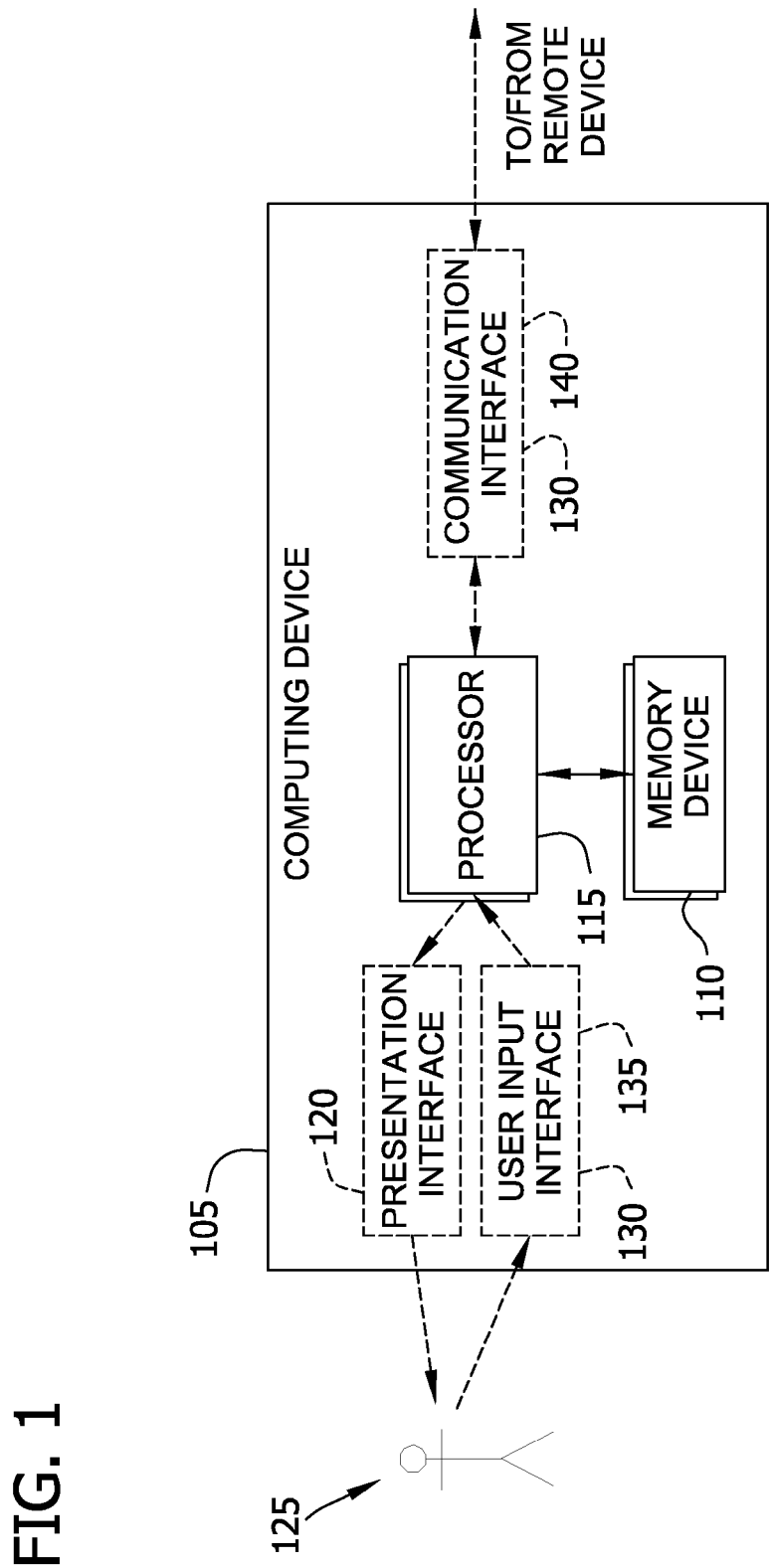
FIG. 1 is a block diagram of an exemplary computing device.

One of the most underutilized potentials in user interfaces is taking advantage of underlying graphical structure. Graphs of data objects can be very complex, and the user can become lost in the many connections.

Many applications use a graphical user interface as a location for providing a simple list of nodes that are adjacent to some given location in the graph. For example, a file directory might be actively displayed in a window, meaning that all of the files within the directory are shown as a simple list with icons. This could just as easily be done in a textual interface as in a graphical interface (minus the icons). Note that a textual command line prompt could show the full path to the directory, with a list of files in the directory. Presenting the directories as a graph would capitalize much more on the underutilized capabilities of a user interface.

One attempt to bolster the ability for users to traverse graphs more effectively is to provide panels or menu banners that provide instant access to many nodes in the graph. For instance, in the graph of menu options for a word processing program, a list of menu options, or tabs, or buttons might allow a user many shortcuts to get to certain key locations.

Frames in a web browser or navigation panels showing bookmarks are other examples of this approach.

While these shortcuts represent an advance from a purely textual interface, they generally do not take advantage of the fact that a graph could be presented as a two-dimensional image, which the user could traverse directly. One problem with doing so is the complexity of the graphs. The user may become lost in a maze of connections. Accordingly, it may be advantageous to provide menu-driven access to large graphs and only to show the edges for one node at a time.

Embodiments described herein allow even large, complex graphs to be traversed simply by the user, taking advantage of the fact that many graphs can be viewed as having two types of data nodes: data objects and data sets. Such embodiments present a complex graph to the user as a classification of the data nodes relative to some location within the graph. For instance, a window could show many directories, in a way that a user can intuitively grasp how to add or remove directories and understand the relationship between them. Files could be dragged from one to another without leaving the window. The actual location of a directory on the computer would become a detail to the user, as searches and file transfers are conducted locally, and directories are shown as local to one another.

Embodiments provided may be advantageous for any user interface in which related items are to be presented and/or selected. The example of a file directory is described above. Another standard case of related items would be Web pages. For example, a standard feature for web browsers is a history of sites visited. The user is permitted to navigate backwards or forwards following a single path of links leading from the first one visited to the current site. If the user backtracks on this list, the option remains to move forward again. However, if the user traversed and backtracked multiple times to various different sites from a single site, all sites but the last visited are removed from this path. For instance, if one went from one's home page to page X, then back to the homepage, then to page Y, then standard backtracking will not allow the user to visit page X again. At least some browsers allow one to see a list of sites visited shown in some order (for instance, they might be listed by date, and within date by website, and within a given website by page). But such a panel or menu does not show the actual order of associations pursued by the user. Usually, a user can recall the associations more effectively if they are presented in the way in which the traversals actually occurred. A stratified tree could provide a new type of history view, allowing the user to retrace his or her steps from the current location to the site desired.

Two applications of the embodiments described include: 1) C is a sub graph; and 2) C is always a single node S. Selecting another node $S_i$ results in the original node S being unselected, and see becoming the node $S_i$.

An example of the first would be a window that shows the associations among a set of file folders chosen, and perhaps that shows the files of each listed beneath its name. An example of the second would be a dialog box that searches for a particular file to open for a given application, presenting the options relative to a current folder S. Differences between a standard file selecting dialog box and one that uses relative classification may include one or more of the following: 1) all folder paths would be shown as relative versus absolute; 2) sub folders and super folders would appear in a similar way; 3) the user could see a large part of the directory graph in a two-dimensional way (many folders could thereby be "open" at the same time); and 4) All of the files that could be reached via a path through a given sub or super directory S could appear to the user as being situated within the directory S.

An exemplary technical effect of the methods, systems, and apparatus described herein includes at least one of (a) determining a data node of interest from the plurality of data nodes, wherein the data node of interest is included in one or more data sets; (b) depicting the data node of interest as a primary node; (c) depicting at least one of the data sets that includes the data node of interest as a secondary node that is subordinate to the primary node; and (d) depicting, by the computing device, an edge between the primary node and the secondary node.

FIG. 1 is a block diagram of an exemplary computing device 105. Computing device 105 includes a memory device 110 and a processor 115 coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. Processor 115 may include one or more processing units (e.g., in a multi-core configuration).

Memory device 110 is one or more devices that enable information such as executable instructions and/or other data to be stored and retrieved. Memory device 110 may include one or more computer readable media, such as, without limitation, dynamic random access memory (DRAM), static random access memory (SRAM), a solid state disk, and/or a hard disk. Memory device 110 may be configured to store, without limitation, a hierarchy of data nodes (e.g., data sets and data objects), node types, computer-executable instructions, and/or any other type of data.

In some embodiments, computing device 105 includes a presentation interface 120 that is coupled to processor 115. Presentation interface 120 presents information, such as data objects and/or classification strategies, to a user 125. For example, presentation interface 120 may include a display adapter (not shown in FIG. 1) that may be coupled to a display device, such as a cathode ray tube (CRT), a liquid crystal display (LCD), an organic LED (OLED) display, and/or an "electronic ink" display. In some embodiments, presentation interface 120 includes one or more display devices. In addition to, or in the alternative, presentation interface 120 may include an audio output device (e.g., an audio adapter and/or a speaker) and/or a printer.

In some embodiments, computing device 105 includes an input interface 130, such as a user input interface 135 or a communication interface 140. Input interface 130 may be configured to receive any information suitable for use with the methods described herein.

In exemplary embodiments, user input interface 135 is coupled to processor 115 and receives input from user 125. User input interface 135 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone). A single component, such as a touch screen, may function as both a display device of presentation interface 120 and user input interface 135.

Communication interface 140 is coupled to processor 115 and is configured to be coupled in communication with one or more remote devices, such as another computing device 105. For example, communication interface 140 may include, without limitation, a wired network adapter, a wireless network adapter, and/or a mobile telecommunications adapter. Communication interface 140 may also transmit data to one or more remote devices. For example, a communication interface 140 of one computing device 105 may transmit an indication of one or more source code portions of interest and/or one or more execution events to the communication interface 140 of another computing device 105.

Figure 2:
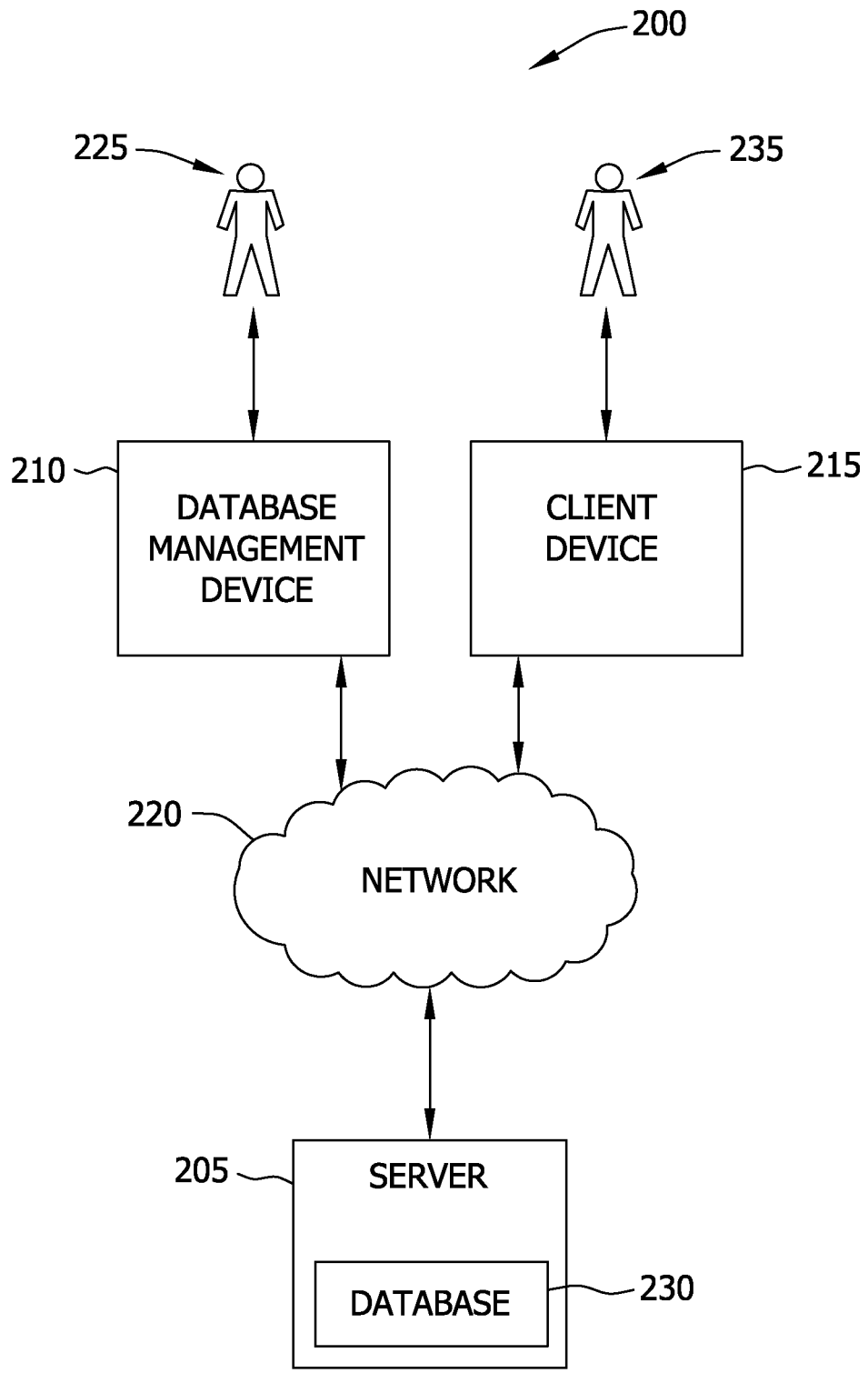
FIG. 2 is block diagram of an exemplary computing system that includes a server, a database management device, and a client device.

FIG. 2 is block diagram of an exemplary system 200 including a server 205, a database management device 210, and a client device 215 coupled in communication via a network 220. Network 220 may include, without limitation, the Internet, a local area network (LAN), a wide area network (WAN), a wireless LAN (WLAN), a mesh network, and/or a virtual private network (VPN). While certain operations are described below with respect to particular computing devices 105, it is contemplated that any computing device 105 may perform any portion or the entirety of the described operations.

In exemplary embodiments, server 205, database management device 210, and client device 215 are computing devices 105 (shown in FIG. 1). Each computing device 105 is coupled to network 220 via a communication interface 140 (shown in FIG. 1). In an alternative embodiment, server 205 is integrated with database management device 210 and/or with client device 215.

Server 205 stores data that is accessible by client device 215. In some embodiments, server 205 executes a database 230 that stores data in a structured format, such as tables with a plurality of columns and rows. In such embodiments, server 205 receives and responds to requests from database management device 210 and client device 215, as described in more detail below. In addition, or alternatively, server 205 may provide data to client device 215 from a source other than database 230. For example, server 205 may transmit files stored at server 205 or some other device to client device 215. As another example, server 205 may execute a software application, such as a web service, that provides data to client device 215.

Database management device 210 interacts with a database administrator 225 (e.g., via user input interface 135 and/or presentation interface 120). For example, database management device 210 may be configured to receive database schema data, such as definitions of tables and/or columns in a relational database, from database administrator 225. Database management device 210 transmits the schema data to server 205 via network 220. Server 205 receives and applies the schema data to database 230.

Client device 215 interacts with a user 235 (e.g., via user input interface 135 and/or presentation interface 120). For example, client device 215 may acquire and/or receive data objects provided by database 230 and present such data to, user 235. For example, client device 215 may present data using relative classification, as described in more detail below. Further, client device 215 may receive data from user 235 and submit the data to server 205, such that database 230 is updated with the submitted data.

In some embodiments, client device 215 is remote to server 205. For example, client device 215 may be located at a facility that is geographically removed from server 205 and/or database management device 210. Further, although client device 215 is described above as receiving data from server 205 and presenting the received data to user 235, in some embodiments, client device 215 presents data that is stored at client device 215. For example, client device 215 may execute database 230 and/or access data stored in one or more files at client device 215.

Embodiments provided are applicable to any connected graph but are described for illustrative purposes with reference to graphs whose nodes are naturally classifiable as one of two types: data objects and data sets. In exemplary embodiments, object nodes meet the following criteria: 1) All object nodes are adjacent one or more set nodes; and 2) No two object nodes are adjacent.

Figure 3:
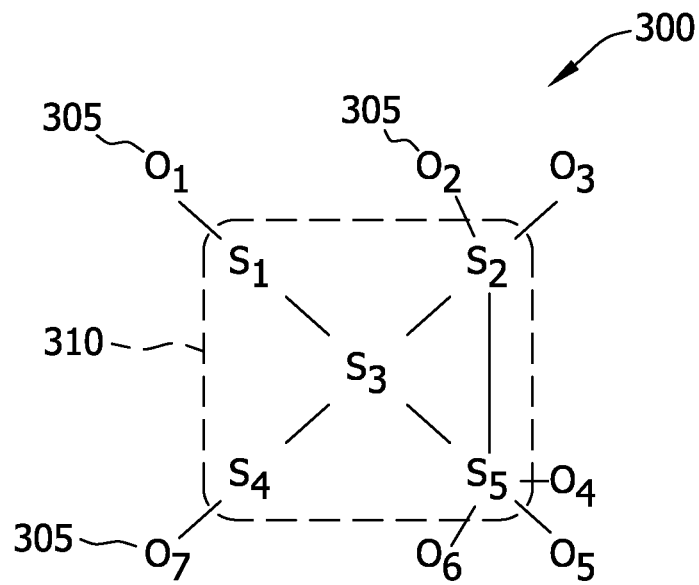
FIG. 3 is a sample graph of abstract data nodes.
Figure 4:
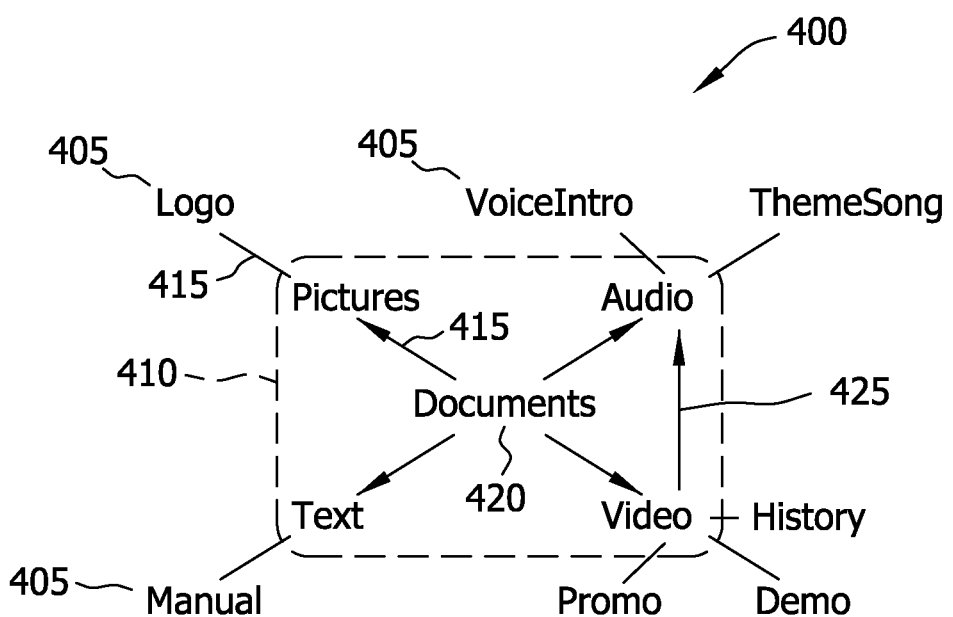
FIG. 4 is a sample graph of data nodes representing a file system.

FIG. 3 is a sample graph 300 of abstract data nodes. Graph 300 includes a plurality of data object nodes 305, labeled O, and a plurality of data set nodes 310, labeled S. A practical example of a graph containing object nodes is a file directory in which data objects represent files and data sets represent folders. FIG. 4 is a sample graph 400 of data nodes representing a file directory. Graph 400 includes a plurality of file nodes 405 representing files and a plurality of directory nodes 410 representing folders, which may be viewable as sets of data objects.

Graph 400 includes edges 415 between related nodes. For example, an edge 415 from a file node 405 to a folder node 410 would indicate that the file represented by the file node 405 is contained in the folder represented by the folder node 410; an edge 415 between folder nodes 410 would indicate that one of the folders represented is a subfolder to the other.

In the example illustrated in FIG. 4, a Documents folder (represented by a Documents folder node 420) associated with a user includes four sub-folders, each of which includes one or more files (represented by file nodes 405). Further, an alias ("shortcut") for the Audio folder has been created within the Video folder, as shown by an alias edge 425. Notably, the criteria for object nodes are not violated: no file node exists without a folder node, and there is no reason to place an edge between two file nodes.

Set nodes may be unrestricted. Specifically, some sets might not contain any objects, and set nodes can have many edges among them, including "cycles", which refer to cyclical relationships that connect two or more sets to each other via multiple paths. In the example of graph 400, the Audio folder is related to the Video folder via both an intermediate folder (the Documents folder) and the alias represented by alias edge 425. In a graph without object nodes, all nodes may be classified as set nodes.

Edges 415 among set nodes can represent relationships (hierarchical or otherwise) among the sets. For example, a given folder may be contained virtually in two folders, causing a cycle in the graph. The edges can be directed or undirected, depending upon the application.

As described below, complex graphs may be presented in an intuitively understood manner. Further, simple user searches and sub-graph selection may be facilitated using the methods provided. In exemplary embodiments, the graph is presented as a classification schema using a stratified tree. From the user's perspective, nodes appear to be either sets or objects within them. Rather than being presented the entire graph, the user may be presented a simplified hierarchy relative to one point (or sub-graph) in the graph. Depending upon the application, the point or sub-graph may be changed dynamically by the user.

Exemplary methods and user interfaces for presenting a hierarchy of data objects according to a scheme of relative classification are described in detail below with reference to FIGS. 5-10. The following exemplary data structures may be maintained by computing device 105 (shown in FIG. 1) to facilitate such methods.

GRAPH: The general graph of data sets and data objects. Each node may be numbered.

C: The current sub-graph including data nodes of interest. If the application is simply traversing a graph without selecting a set of nodes at all (e.g., a generic file selector called by applications to prompt the user for a given file or files to perform an action), then C might consist of a single set node.

ACYCLIC: (Optional) A tree derived by reducing all cycles in GRAPH to single virtual "cycle nodes". In the event that two or more cycles in the original graph share nodes, they may be together reduced to a cycle node. The node numbers for all normal nodes may be the same as in GRAPH, whereas the cycle nodes may be given numbers higher than the maximum node number in GRAPH.

CURRENT: An array of Boolean values indexed to all node numbers in GRAPH that stores whether a node is in C.

CONTENTS: An array of data sets indexed to node numbers in GRAPH, indicating for any node n what object nodes are adjacent to n in GRAPH. In exemplary embodiments, CONTENTS(n) is empty for any object node n.

CYCLE: An array indexed to node numbers in GRAPH that stores for any node n which cycle node (if any) contains n in ACYCLIC.

CYCLENODES: An array of sets indexed to cycle nodes in ACYCLIC that indicates for any cycle node C which actual nodes n are contained in C node.

CURRENTCONTENTS: An optional array of sets indexed to node numbers in GRAPH, indicating for any node n what object nodes are contained in a path containing n from C in ACYCLIC. This array may be advantageous for an application where C is not expected to change frequently, and where the user is expected to ask for the contents of many sets. Otherwise, the CURRENTCONTENTS of a set node can be calculated as needed.

A linear-time graph traversal of GRAPH can determine whether any cycles exist and trivially produce ACYCLIC, as well as the arrays CONTENTS, CYCLE, and CYCLENODES. In exemplary embodiments, whenever a node n is added to or removed from C, the following operations are performed by computing device 105: 1) The array CURRENT is updated appropriately based on the addition or removal; 2) The graph C is updated to include n and the path to n in ACYCLIC or to remove n, and the user is prompted to select the path desired in GRAPH through any cycle nodes; and 3) The graph is redrawn.

Figure 5:
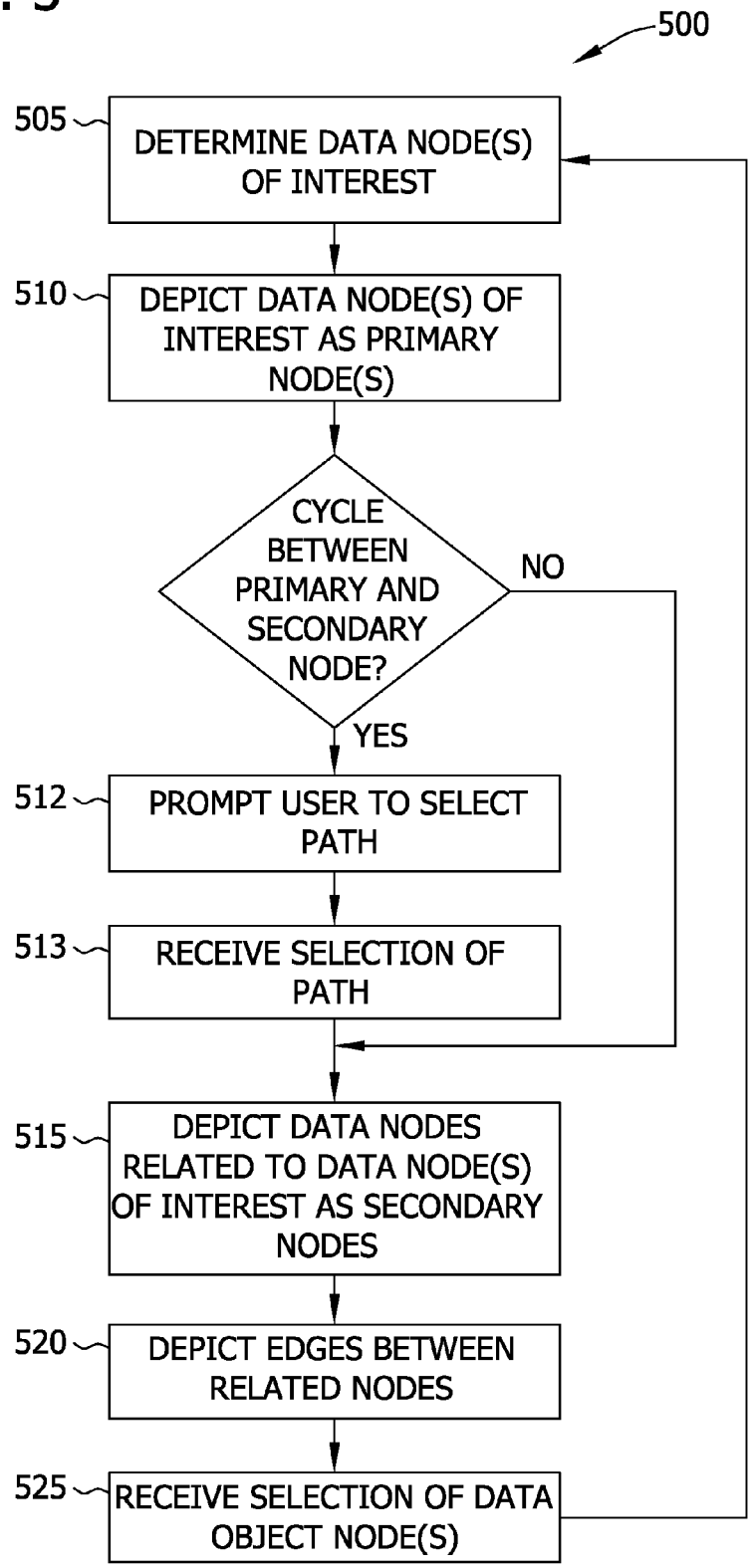
FIG. 5 is a flowchart of an exemplary method for use in presenting a graph of data objects using a scheme of relative classification.
Figure 6:
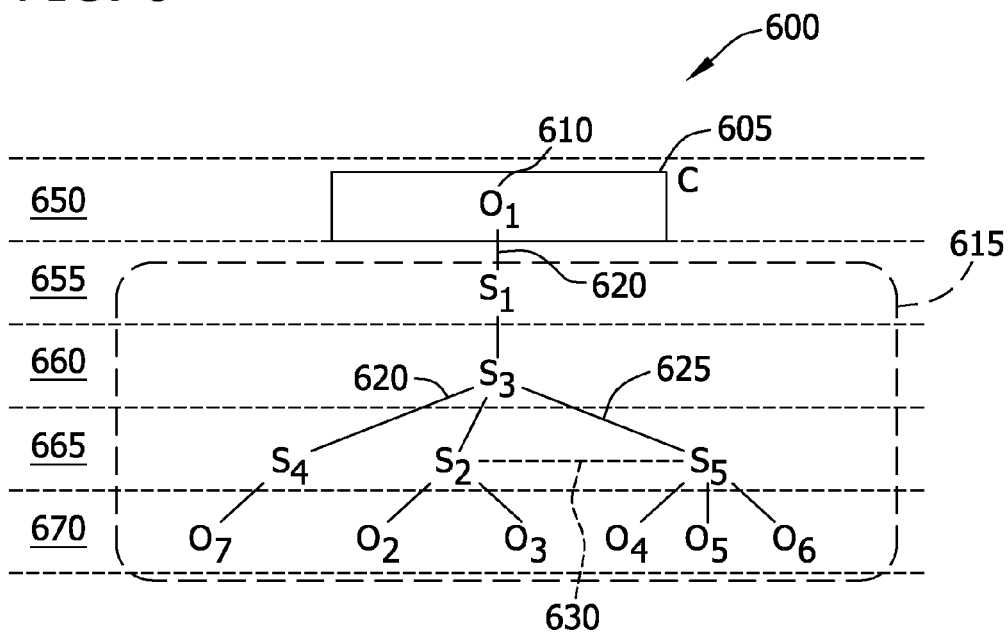
FIG. 6 is an exemplary user interface for presenting a graph of data nodes relative to a data node of interest.

FIG. 5 is a flowchart of an exemplary method 500 for use in presenting a graph of data objects using a scheme of relative classification. Portions of method 500 may be performed, for example, using any one of or any combination of computing devices 105 in system 200 (shown in FIG. 2). FIG. 6 is an exemplary user interface 600 for presenting a graph of data nodes relative to a data node of interest.

In exemplary embodiments, computing device 105 determines 505 a data node of interest, whether a data set or a data object, from the plurality of data nodes in the graph. The data node of interest is included in one or more data sets. For example, computing device 105 may receive a selection of the data node of interest via an input interface 130 (shown in FIG. 1). As another example, computing device 105 may determine a default data node of interest that is associated with the plurality of data nodes, with a user, and/or with an operation being performed by a user. In the context of graph 400 (shown in FIG. 4), if the user is opening a document or saving a new document, computing device 105 may determine 505 the data node of interest to be the user's Documents folder based on the fact that the user is performing an open or save operation with respect to documents in general. Similarly, if the user is opening or saving a particular type of file, such as a video, computing device 105 may determine 505 the data node of interest to be the Video folder. Further, after viewing a graph of nodes that are classified based on one data node of interest, as described below, the user may select another data node within the graph as the data node of interest, and the graph may be rearranged based on the newly selected data node of interest.

Referring to FIGS. 5 and 6, a current sub-graph C 605 can be selected from the graph based on the data node of interest, and the rest of the graph can be represented as a classification taxonomy relative to C 605. As shown in user interface 600, computing device 105 determines 505 that a first data object $O_1$ is the data node of interest and depicts 510 (e.g., draws) the data node of interest as a primary node 610.

Computing device 105 also depicts 515 data nodes that are related to (e.g., that include and/or are included in) the data node of interest as secondary nodes 615 that are subordinate to primary node 610. Notably, data nodes that are positioned above the data node of interest in a hierarchy may be presented as secondary to primary node 610. For example, a data set that includes the data node of interest may be depicted as a secondary node 615.

Computing device 105 further depicts 520 an edge 620 between related nodes. For example, an edge 620 may be depicted 520 between primary node 610 and each secondary node 615, whether directly or indirectly. In some embodiments, such as that shown in FIG. 6, data nodes are presented in a hierarchical fashion, with sets being shown as subsets to each other relative to primary node 610. In addition, or alternatively, two adjacent sets $S_1$ and $S_2$ can be presented as if $S_2$ was a subset of $S_1$ relative to C any time that $S_1$ is closer to C on some path.

Notably, the underlying graph shown in FIG. 6 is the same as that shown in FIG. 3. However, in FIG. 6, the objects in the graph that are not in C are classified relative to C. More specifically, each such object is contained in $S_1$, and in the subset $S_3$. The subset $S_3$ contains three subsets of its own: $S_2$, $S_4$ and $S_5$.

As shown in FIG. 6, the graph includes a cyclical relationship, or a "cycle", among $S_2$, $S_3$, and $S_5$ due to $S_5$ being related to $S_2$ by both an indirect path (represented by a first edge 625) through $S_3$ and a direct path (represented by a second edge 630). Accordingly, the hierarchy presented may or may not be a simple tree structure; in such a scenario, links associated with a longer path (e.g., having more edges than the shortest available path) to a given node from C may be presented as a backlink, graphically distinguished from other edges 620. Graphical distinction may be accomplished using a background pattern, a background color, a line weight, a line pattern, a line color, an icon, an animation, and/or any other method of visually differentiating user interface elements from one another. For example, edges 620 in user interface 600 may be generally drawn with a solid line pattern, whereas edges associated with a longer path (e.g., second edge 630) may be drawn with a dashed line pattern.

If an application is desired to keep track of how two objects are linked to one another, the difference between the types of links between the objects may be relevant. For instance, to record a path to a file, one may use any virtual path (e.g., a "shortcut") specified by the user; otherwise, a user might not realize that a direct path exists, and might be confused if the longer path is not presented. Accordingly, edges 620 may be graphically distinguished by the type of the link represented edges 620, such as a normal path or a virtual path.

In some embodiments, a graph of data nodes is presented as a stratified tree. For example, the entire graph of C could be regarded as a single node and positioned in a first stratum 650. Any set node S not contained in C with an edge 620 to one of the nodes contained in C could be placed into a second stratum 655 below first stratum 650. One of the links between S and the nodes of C could be treated as primary, and the rest as secondary. Doing so effectively creates a tree.

If the user elects to display subsets within a given set S, the subsets may be positioned in a stratum below the set S. As shown in FIG. 6, $S_3$ is positioned below $S_1$ in a third stratum 660, and $S_2$, $S_4$, and $S_5$ are positioned in a fourth stratum 665 below third stratum 660. Further, data objects O may be positioned below the sets that contain the data objects. As shown in FIG. 6, data objects O in a bottom, or fifth, stratum 670. In some embodiments, each data object not in C is presented in the stratum directly below the set containing the data object. In other embodiments, all data objects not in C are presented in the same (e.g., bottom-most) stratum.

Figure 7:
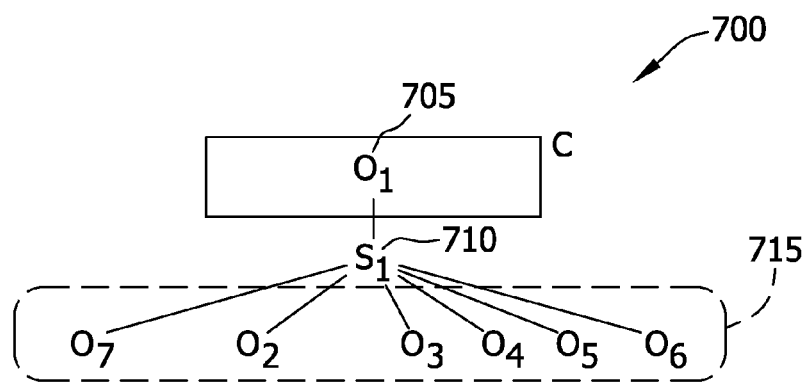
FIG. 7 is an exemplary user interface for presenting data nodes within a set adjacent to a primary node.

Furthermore, given a path from C to an object node O that passes through a set node S, O can be presented as one of the elements of S without presenting all of the subsets (i.e., the full path) between them. FIG. 7 is an exemplary user interface 700 for presenting data nodes within a set adjacent to a primary node 705. In the embodiment shown in FIG. 7, computing device 105 depicts 510 the data node of interest as primary node 705, depicts 515 the data set $S_1$ that contains the data node of interest as a first secondary node 710, and depicts 515 data objects contained in any data set related to $S_1$ as a set of second secondary nodes 715 contained within first secondary node 710. Accordingly, all data objects related to $O_1$ are presented as within $S_1$.

Such an embodiment may be advantageous in the context of a file directory. For example, a user may know that a desired file is in a certain directory, but may not recall the subdirectory that contains the file. Accordingly, a spreadsheet application, for instance, can show all available spreadsheet files in every directory without showing pathnames, except in the case of ambiguous names. In fact, once a user views directories as sets, paths as conventionally conceived (e.g., indicating precisely where a file exists in the hierarchy) become unnecessary for unambiguous file names. Files are all classified into sets, and long paths are a mere technicality. In practice, an option may be made available to allow the user to see pathnames for files, accommodating scenarios in which a user relies on directory names to understand the contents of a file.

When presenting a large graph, depicting all of the details (e.g., all nodes and all edges) may be impractical and/or may detract from the display of the hierarchy of sets. In some embodiments, data objects are shown separately from data sets; for instance, data objects within a data set may be concealed initially and presented upon a selection of the data set by a user. For example, the selection may be a click of a mouse or touch screen over a data set node, a mouse-over event (e.g., a pointer hovering over the data set node for a predetermined duration), and/or any other method of indicating interest in the data set node via input interface 130 (shown in FIG. 1).

Figure 8:
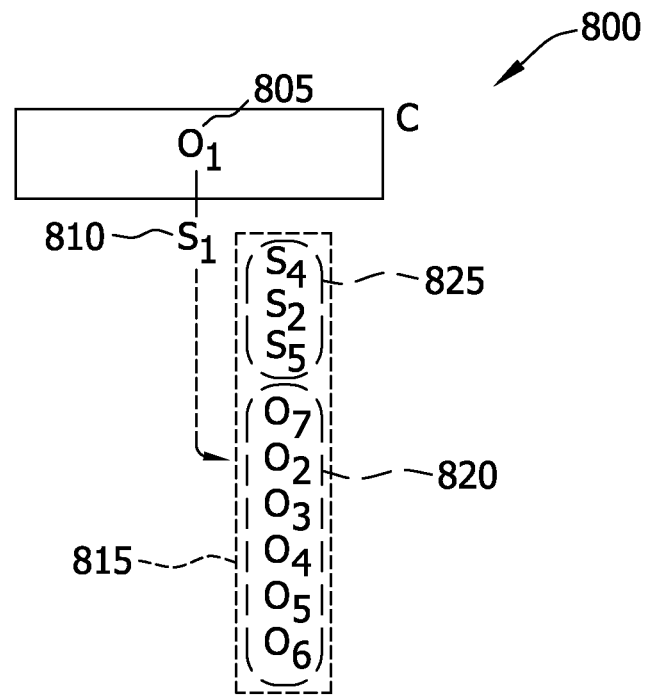
FIG. 8 is an exemplary user interface for presenting data nodes upon selection of a data set node.

FIG. 8 is an exemplary user interface 800 for presenting data nodes upon selection of a data set node. Like user interface 700 (shown in FIG. 7), user interface 800 includes a primary node 805 representing a data object of interest $O_1$ and a secondary node 810 representing the data set $S_1$ that contains $O_1$. When secondary node 810 is selected, computing device 105 presents a list 815 of data nodes contained within data set $S_1$. List 815 may include data object nodes 820 representing data objects contained within (e.g., directly and/or indirectly) data set $S_1$ and/or data set nodes 825 representing data sets contained within (e.g., direction and/or indirectly) data set $S_1$.

Referring to FIGS. 5 and 6, in exemplary embodiments, the user can select one or more presented data objects to add to C and/or select a subset to add the data objects within the subset to C. For example, immediate subsets of the adjacent sets may be shown to allow the user to navigate and add subsets to the sub-graph. In such embodiments, computing device 105 receives 525 a selection of one or more data object nodes and determines 505 the data nodes of interest based on the newly selected data object nodes and/or the previously determined 505 data node of interest. Computing device 105 then proceeds to depict 510 the data nodes of interest as primary nodes, depict 515 related data nodes as secondary nodes, and depict 520 edges between related nodes, as described above. In such a scenario, a plurality of data nodes of interest may be depicted 510 as primary nodes.

Figure 9:
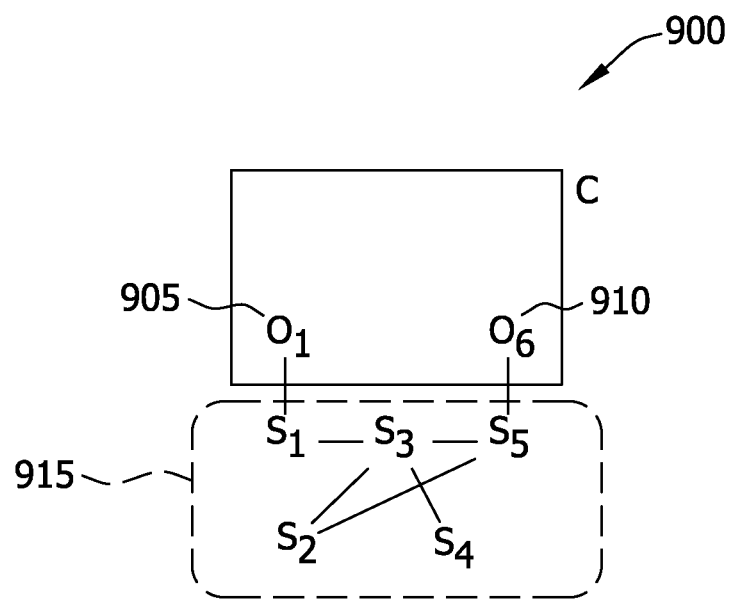
FIG. 9 is an exemplary user interface for presenting a plurality of data nodes of interest as primary nodes.

FIG. 9 is an exemplary user interface 900 for presenting a plurality of data nodes of interest as primary nodes. In the example of user interface 900, the user has selected $O_6$ from the list of contents for $S_1$ in user interface 600 (shown in FIG. 6). $O_1$, previously determined 505 as a data node of interest, is depicted 510 as a first primary node 905 in the current sub-graph C. $O_6$ is depicted 510 as a second primary node 910 in C. As in user interface 600, $S_1$ is depicted 515 as a secondary node directly below C. In addition, because $O_6$ is contained within $S_5$, $S_5$ is also depicted 515 as a secondary node directly below C.

User interface 900 is shown without data objects not in C presented. It is contemplated that user interface 900 may include data object nodes representing such objects, as described above with reference to FIGS. 6-8. Further, in the example shown in FIG. 9, the newly selected data objects are added to C. Alternatively, the newly selected data objects may replace any previously selected data nodes of interest in C.

Referring to FIGS. 5 and 9, in some embodiments, if a cycle exists between a primary node and a secondary node, computing device 105 (shown in FIG. 1) prompts 512 the user to select a path between the primary node and the secondary node. For example, computing device 105 may prompt 512 the user to select whether $S_3$ is connected to $S_5$ directly or via $S_2$. Computing device 105 receives 513 the selection of the path and proceeds to depict 515 secondary nodes, as described above.

Figure 10:
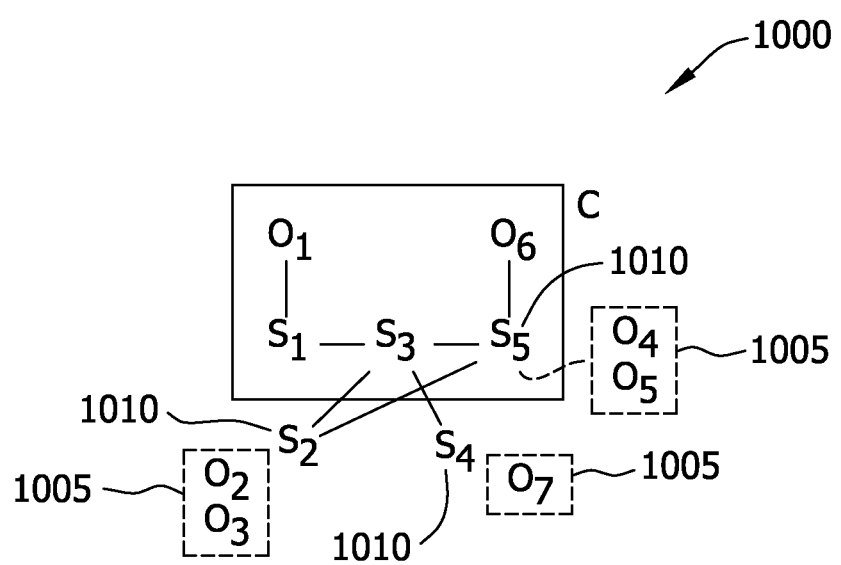
FIG. 10 is an exemplary user interface for presenting data objects as lists of data object nodes adjacent to data set nodes representing data sets that contain the data objects.

As described above with reference to FIG. 6, data objects not in C may be presented as individual data nodes subordinate to (e.g., in a stratum below) the data sets containing such data objects. Alternatively, data objects not in C may be presented as lists adjacent to the data sets containing such data objects. FIG. 10 is an exemplary user interface 1000 for presenting data objects as lists 1005 of data object nodes adjacent to data set nodes 1010 representing data sets that contain the data objects.

Embodiments described provide significant flexibility in presentation of data object graphs. For instance, abridged lists of contents may be presented when the space available for presenting a graph is limited. In exemplary embodiments, the graph is presented by drawing all of the nodes within current sub-graph C and drawing the edges among them, if any. Further, C and/or the nodes within C may be graphically distinguished from the rest of the graph. The data set nodes adjacent to C are drawn, with edges connecting them to data nodes in C representing relationships between such nodes.

In some embodiments, the other nodes are not drawn. However, the user can view lists of adjacent set nodes, including any subset $S_{Sub}$ for any set node S depicted, such that $S_{Sub}$ is not in C already. Depending on the application and available space, these lists may be visible within a box adjacent to the particular set node (e.g., as shown in FIG. 10), or may be visible in response to a selection event (e.g., as shown in FIG. 8).

Any object node reachable by a path from C that traverses a given drawn set node S may be presented in a list for S; if space is limited, then only the object nodes adjacent to S itself can be listed. Space may be considered limited if, for example, insufficient space is available to draw all data object nodes. Depending on the size of a list of objects viewed as within a certain set, such a list may be classified by subsets for simplicity.

In exemplary embodiments, all object nodes in C are drawn at the top of a graph, all of the sets in C are drawn in the vertical middle of the graph, and adjacent set nodes are drawn below. The graph may be presented as a stratified tree, at least in part by treating any cyclical portion of the selected subgraph as a single "node" to determine its placement within the drawing and then allowing the space needed to show all of its nodes and internal edges.

Embodiments described herein may be particularly effective if the graph is a tree. In such a scenario, every object not in the current location sub-tree may be readily visible in exactly one set in the graph. In such a case, a stratified tree (e.g., as shown in FIG. 6) may be used to draw the tree. One common possibility where a similar effect is achieved is a virtual hierarchy. For instance, a file system might classify every file and folder as actually residing in one primary folder, and other folder locations (including through aliases or shortcuts) can be seen as only virtual. Another example could be to show the list of traversed links among websites in a current web browsing session as a hierarchy, and to show un-traversed links among the sites as virtual.

The technique of showing all data objects reachable on a path through S as being contained within S may be advantageous in the context of user-selection applications. For instance, a folder that contains many word-processing documents that a user might wish to open, some nested within many levels of sub-folders, could appear as a simple list to a user who is being prompted to select the one that he wants to open next. Such an implementation spares the user from having to search through or click on many folders in a hierarchy.

The presentation described herein need not be in the form of a two-dimensional graph. For example, a dynamically changing menu could allow the user to select from sets where menu options represent sets, subsets and objects relative to the fields chosen so far.

In some embodiments, C, or some portion of C, may not be presented. In addition, or alternatively C may be limited to being a single set node.

In exemplary embodiments, computing device 105 provides the user interfaces described herein for presentation to a user. For example, computing device 105 may directly present such a user interface via a presentation interface 120 (shown in FIG. 1) and/or may transmit the user interface via a communication interface 140 (shown in FIG. 1) to another computing device 105 for presentation.

The embodiments described enable a user to view and select data object nodes as classified relative to one or more nodes of interest. Accordingly, such embodiments may be used in the context of any software application that allows a user to select electronic documents (e.g., a file) to read, view, write, manipulate, and/or otherwise access. For example, while the user interfaces described herein are presented, the user may select one or more depicted data objects to access and proceed to access the selected data objects within the software application.

In exemplary embodiments, the user is allowed to add set and object nodes to C, and to remove set and object nodes from C. For example, the user interfaces described may include addition and subtraction icons adjacent to presented nodes and/or may allow a user to drag presented nodes into or out of C.

Furthermore, as described above, the user may be enabled to view the contents of a set. For example, the data objects within a set may be presented as nodes below the set and/or in a list adjacent to the set. The objects contained within a set may be presented by first defining CurrentContents to be a list containing everything in CONTENTS(S). The sub-tree of S relative to C is traversed in ACYCLIC. For every node Subset visited, the objects in CONTENTS(Subset) are added to CurrentContents. If CYCLE(S)>0 meaning that S is in a cycle, then for all of the nodes $S_i$ in CYCLECONTENTS(CYCLE (S)), if $S_i$ is not selected then add the contents of $S_i$ to CurrentContents. CurrentContents is then shown in a way the user can click on one object to select it. All unselected adjacent set nodes may be positioned at the top of the list as subsets, as shown in FIG. 8. An alternative representation of the list would be to list the subsets (unselected set nodes adjacent to S) with all of the nodes for each one following.

Exemplary Operating Environment

Operations described herein may be performed by a computer or computing device. A computer or computing device includes one or more processors or processing units and at least one memory device, such as a system memory and/or some form of computer-readable media. By way of example and not limitation, computer-readable media comprise computer storage media and communication media. Computer storage media are non-transitory and include volatile and nonvolatile, removable and non-removable media implemented in any method or technology for storage of information such as computer-readable instructions, data structures, program modules or other data. Communication media typically embody computer-readable instructions, data structures, program modules, or other data in a modulated data signal such as a carrier wave or other transport mechanism and include any information delivery media. Combinations of any of the above are also included within the scope of computer-readable media.

In exemplary embodiments, any portion or the entirety of the operations described herein are encoded as computer-executable instructions, which are embodied on one or more non-transitory computer-readable media. When executed by at least one processor, the computer-executable instructions cause the processor to perform the encoded operations.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other apparatus and methods.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising a computing device performing the steps of:
    visually depicting a simplified rendition of a complex graph, said complex graph comprising a plurality of data nodes representing one or more data sets and one or more data objects, wherein each data set includes zero or more data objects and zero or more other data sets;
    determining, from the plurality of data nodes in the complex graph, at least one data node of interest to a user, wherein each data node of interest is included in and thus defined as being hierarchically subordinate to one or more data sets;
    visually depicting in the simplified rendition each data node of interest as a primary node in a specific area of a user display designated to depict primary nodes;
    visually depicting in the simplified rendition at least one secondary node that is visually depicted in the simplified rendition as being hierarchically subordinate to a primary node, but is a data set that in the complex graph includes and is thus defined as being hierarchically superior to the corresponding data node of interest; and
    visually depicting in the simplified rendition at least one edge between a primary node and a secondary node; wherein:
    visually depicted secondary nodes are not contained within the specific area designated to depict primary nodes; whereby:
    the simplified rendition comprises a new and inverted node hierarchy compared with the node hierarchy of the complex graph.

2. A method in accordance with claim 1, wherein determining a data node of interest comprises the computing device receiving, via an input interface, a selection of the data node of interest.

3. A method in accordance with claim 1, wherein determining a data node of interest comprises the computing device determining a default data node of interest associated with one or more of the following: the plurality of data nodes, a user, and an operation being performed by a user.

4. A method in accordance with claim 1, further comprising the computing device:
    identifying data objects related to a secondary node; and
    visually depicting in the simplified rendition the identified data objects as nodes contained within said secondary node.

5. A method in accordance with claim 4, wherein identifying data objects related to a secondary node comprises identifying data objects included in subsets of the data set that constitutes the secondary node.

6. A method in accordance with claim 1, further comprising the computing device visually depicting in the simplified rendition data sets related to a secondary node as nodes subordinate to said secondary node.

7. A method in accordance with claim 1, wherein determining a data node of interest comprises determining a plurality of data nodes of interest, and the method further comprises the computing device visually depicting in the simplified rendition any data sets that include a data node of interest as secondary nodes subordinate to the primary node.

8. A method in accordance with claim 1, further comprising the computing device:
    positioning the specific area in a first stratum of the simplified rendition; and
    positioning at least some secondary nodes in a second stratum of the simplified rendition, said second stratum being distinct from the first stratum and situated below the first stratum.

9. A device comprising:
    a memory device for storing a simplified rendition of a complex graph, said complex graph comprising a plurality of data nodes representing one or more data sets and one or more data objects, wherein each data set includes zero or more data objects and zero or more other data sets; and
    a processor coupled to the memory device and programmed to simplify the complex graph by creating a new and inverted node hierarchy, compared with the node hierarchy of the complex graph, by performing the following steps:
        determining from the plurality of data nodes in the complex graph at least one data node of interest to a user, wherein each data node of interest is included in and thus deemed hierarchically subordinate to one or more data sets of the complex graph;
        visually depicting in the simplified rendition each data node of interest as a primary node in a specific area of a user display designated to depict primary nodes;
        visually depicting in the simplified rendition at least one secondary node that is visually depicted in the simplified rendition as being hierarchically subordinate to a primary node, but is a data set that in the complex graph includes and therefore is deemed hierarchically superior to the corresponding data node of interest; and
        visually depicting in the simplified rendition at least one edge between a primary node and a secondary node; wherein:
        visually depicted secondary nodes are not contained within the specific area designated to depict primary nodes.

10. A device in accordance with claim 9, wherein the processor is programmed to determine a data node of interest by receiving, via an input interface, a selection of the data node of interest.

11. A device in accordance with claim 9, wherein the processor is programmed to determine a data node of interest by determining a default data node of interest associated with one or more of the following: the plurality of data nodes, a user, and an operation being performed by a user.

12. A device in accordance with claim 9, wherein the processor is further programmed to:
    identify data objects related to a secondary node; and
    visually depict in the simplified rendition the identified data objects as nodes contained within said secondary node.

13. A device in accordance with claim 12, wherein the processor is programmed to identify data objects related to a secondary node by identifying data objects included in subsets of the data set that constitutes said secondary node.

14. A device in accordance with claim 9, wherein the processor is further programmed to depict data sets related to a secondary node as nodes subordinate to said secondary node.

15. One or more non-transitory computer-readable media having computer-executable instructions embodied thereon, wherein when executed by at least one processor, the computer-executable instructions cause the processor to:

determine at least one data node of interest to a user from among a plurality of nodes in a complex graph, said complex graph comprising a plurality of data nodes that represent one or more data sets and one or more data objects, wherein each data set includes zero or more data objects and zero or more other data sets, and wherein each data node of interest is included in and thus deemed hierarchically subordinate to one or more data sets;

visually depict, in a simplified rendition of the complex graph, each data node of interest as a primary node in a specific area of a user display designed to depict primary nodes;

visually depict, in said simplified rendition, at least one secondary node that is visually depicted in the simplified rendition as being hierarchically subordinate to a primary node, but is a data set that in the complex graph includes and is thus deemed hierarchically superior to the corresponding data node of interest; and visually depict in said simplified rendition at least one edge between a primary node and a secondary node; wherein:

visually depicted secondary nodes are not contained within the specific area designated to depict primary nodes; whereby:

the simplified rendition comprises a new and inverted node hierarchy, compared to the node hierarchy of the complex graph, and the simplified rendition is visually presented to the user.

16. One or more non-transitory computer-readable media in accordance with claim 15, wherein the computer-executable instructions further cause the processor to:

determine a plurality of data nodes of interest; and visually depict in the simplified rendition any data sets that include a data node of interest as secondary nodes subordinate to the primary node.

17. One or more non-transitory computer-readable media in accordance with claim 15, wherein the computer-executable instructions further cause the processor to:

identify data objects related to a secondary node; and visually depict in the simplified rendition the identified data objects as nodes contained within said secondary node.

18. One or more non-transitory computer-readable media in accordance with claim 15, wherein the computer-executable instructions cause the processor to identify data objects related to a secondary node by identifying data objects included in subsets of said secondary node.

19. One or more non-transitory computer-readable media in accordance with claim 15, wherein the computer-executable instructions further cause the processor to visually depict in the simplified rendition a plurality of data sets related to a secondary node as nodes subordinate to said secondary node.

20. One or more non-transitory computer-readable media in accordance with claim 15, wherein the computer-executable instructions further cause the processor to:

position the specific area in a first stratum of the simplified rendition; and position at least some secondary nodes in a second stratum of the simplified rendition, said second stratum being distinct from the first stratum and located below the first stratum.

21. The method of claim 1 wherein each secondary node represents a subset of the complex graph.

22. The method of claim 1 wherein the entire complex graph is readily accessible to a user via the nodes that are visually depicted in the simplified rendition.

* * * * *